United States Patent Office 3,080,363
Patented Mar. 5, 1963

3,080,363
SENSITIZING DYES DERIVED FROM 2-METHYL-6-(2-CARBAMYLETHOXY)-BENZOTHIAZOLES
Lester Horwitz, Bronx, N.Y., and Curt B. Roth, Glenview, Ill., assignors to General Aniline & Film Corporation, New York, N.Y., a corporation of Delaware
No Drawing. Filed Dec. 27, 1960, Ser. No. 78,205
5 Claims. (Cl. 260—240.6)

This invention relates to sensitizing dyes derived from 2-methyl-6-($\beta$-carbamylethoxy)-benzothiazoles and to the silver halide emulsions sensitized with such dyes.

Benzothiazole radicals which are substituted in the 6-position by a hydroxy, methoxy or carboxyethoxy group have already been recommended as intermediates in the preparation of certain cyanine dyes. However, the methods described so far do not provide benzothiazole nuclei in which a carboxamido group is attached to the 6-position of the benzothiazole by means of an ether linkage.

We have now found that extremely valuable sensitizing dyes can be prepared from benzothiazoles which contain a methyl group in the 2-position, a hydrogen atom or methyl group in the 5-position and a carbamylethoxy group in the 6-position. These bases, which are readily quaternized by conventional methods, can be reacted with cyclammonium quaternary salts containing a reactive group on the $\alpha$-carbon to produce, inter alia, mono- and polymethine cyanine dyes which are valuable sensitizers for silver halide emulsions.

Among the objects of our invention are said sensitizing dyes and silver halide emulsions sensitized with said dyes. The bases which are used in the preparation of our dyes are 2-methyl-6-($\beta$-carbamylethoxy-benzothiazoles having the following general structure:

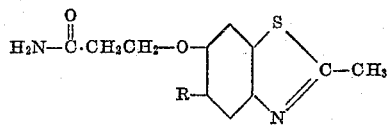

wherein R is a hydrogen atom or a methyl group.

These compounds are prepared by the controlled hydrolysis of ($\beta$-cyanoethoxy)-benzothiazole or 2,5-dimethyl-6-($\beta$-cyanoethoxy)-benzothiazole. The latter compounds are prepared by reacting the corresponding 6-hydroxy benzothiazoles with acrylonitrile as described in Roth, Horwitz and Levine's copending application entitled "2-Methyl-6-($\beta$-Cyanoethoxy)-Benzothiazoles As Sensitizing Dye Intermediates"; Serial No. 724,274; filed March 27, 1958; now United States Patent 2,928,839.

The controlled hydrolysis which is carried out at moderately elevated temperatures, below the boiling point of water, preferably between the range of 60° to 80° C., uses concentrated sulfuric or phosphoric acid as the hydrolyzing agent. The reaction is illustrated by the following formulae:

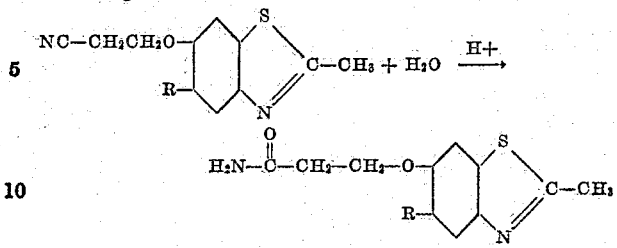

wherein R has the values given above.

The above obtained 6-($\beta$-carbamylethoxy)-substituted benzothiazole base may be readily quaternized by conventional methods to produce the desired cyclammonium quaternary salts for the cyanine dye synthesis. For instance, the methiodide and the ethiodide are obtained by heating the base with methyl iodide or ethyl iodide, respectively, under pressure in a sealed container for several hours at 96°–100° C. The quaternary salts obtained are characterized by the following general formula:

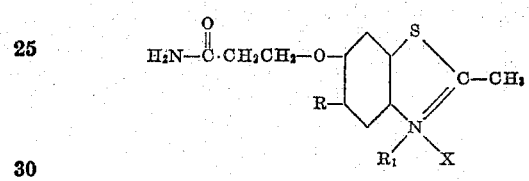

wherein R has the value given above; $R_1$ is alkyl such as methyl, ethyl, propyl, $\beta$-hydroxyethyl, $\gamma$-hydroxypropyl, allyl and the like; carboxyalkyl, such as carboxymethyl, carboxyethyl and the like; aralkyl, e.g., benzyl, phenethyl and the like; and X is an anion such as chloride, bromide, iodide, methylsulfate, ethyl-sulfate, perchlorate, p-toluenesulfonate and the like.

The above quaternary ammonium salts may be converted into the sensitizing dyes which are characterized by the following general formulae:

A

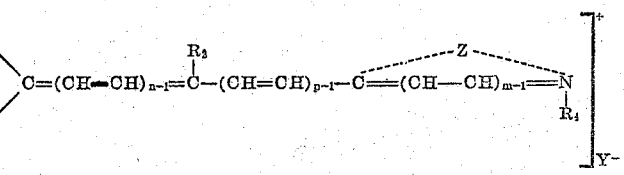

and

B

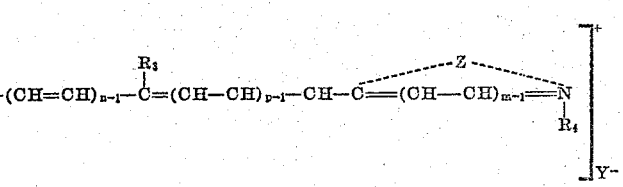

wherein R and $R_1$ have the values given above; m, n and p represent a positive integer of from 1 to 2; $R_2$ and $R_3$ are either hydrogen or a lower alkyl group, e.g., methyl, ethyl, propyl and the like; $R_2$ being only hydrogen when n and p equal 1; $R_4$ represents an alkyl group such as methyl, ethyl, propyl, butyl, amyl; a hydroxyalkyl group such as hydroxymethyl, hydroxyethyl, hydroxypropyl and the like; carboxyalkyl such as carboxymethyl, carboxyethyl, carboxypropyl and the like; aralkyl, e.g., benzyl, phenethyl, and the like; Y represents an anionic radical, e.g., Cl, Br, I, $ClO_4$, $SO_4CH_3$, $SO_4C_2H_5$, $SO_3C_6H_4CH_3$; and the like; and Z represents the hetero atoms necessary to complete a 5- or 6-membered nitrogenous heterocyclic system of the type used in cyanine dyes, such as pyridine, lepidine, quinoline, indoline, oxazole, thiazoline, thiazole, selenazole, selenazoline, oxazoline, benzothiazole, benzoselenazole, benzoxasole, naphthothiazole and the like.

These sensitizing dyes are prepared by heating the above 6-(β-carbamylethoxy)-benzothiazolium salts in the presence of an acid binding agent such as pyridine, trimethylamine, triethlamine and the like with a cyclammonium quaternary salt having a reactive grouping on the carbon atom in the 2-position of the heterocyclic ring, for instance, a halogen atom, e.g., chlorine, bromide, or the like, and an alkylmercapto group, e.g., methylmercapto, ethylmercapto and the like; an alkylmercaptovinyl group, e.g., β-methylmercaptovinyl, β-ethylmercaptovinyl and the like; a β-alkylmercapto-β-alkylvinyl group, e.g., β-methylmercapto-β-methylvinyl, β-ethylmercapto-β-ethylvinyl and the like; β-acetanilidovinyl, 4-acetanilido, 3-butadienyl, and 6-acetanilido-1,3,5-hexatrienyl.

As examples of suitable cyclammonium quaternary cyanine dye salt intermediates having a reactive group in the 2-position to the nitrogen atom thereof so as to form a monomethine dye, the following may be mentioned:

2-methylmercapto-6-methylquinoline ethiodide
2-methylmercapto-6-methoxyquinoline ethiodide
2-methylmercaptopyridine ethiodide
2-methylmercaptothiazoline ethiodide
2-phenylmercaptothiazoline ethiodide and the like.

In preparing trimethine cyanine dye salts, the following cyclammonium quaternary cyanine dye salt intermediates having a reactive group in the β-position of the side chain attached to the carbon atom in the 2-position of the heterocyclic nucleus may be employed:

2-(β-acetanilidovinyl)-thiazoline ethiodide
2-(β-acetanilidovinyl)-benzothiazole ethiodide
2-(β-acetanilidovinyl)-benzoxazole ethiodide
2-(β-ethyl-β-ethylmercaptovinyl)-5-methoxybenzoselenazole ethiodide
2-(β-methylmercapto-β-methylvinyl)-benzothiazole ethiodide.
2-(β-methylmercapto-β-propylvinyl)-benzothiazole ethiodide In preparing pentamethine and heptamethine cyanine dyes, the following cyclammonium quaternary salts having a reactive group in the delta- and omega-positions of the side chain attached to the carbon atom in the 2-position of the heterocyclic nucleus may be employed:

2-(4-acetanilido-1,3-butadienyl)-pyridine ethiodide
2-(4-acetanilido-1,3-butadienyl)-benzoxazole ethiodide
2-(4-anilino-3-methyl-1,3-butadienyl)-pyridine ethiodide
2-(4-anilino-3-methyl-1,3-butadienyl)-β-naphthoxazole ethiodide
2-(4-anilino-3-ethyl-1,3-butadienyl)-α-naphthothiazole ethiodide
2-(6-anilino-1,3,5-hexatrienyl)-thiazoline ethiodide
2-(6-anilino-1,3,5-hexatrienyl)-α-naphthothiazole ethiodide
2-(6-anilino-1,3,5-hexatrienyl)-β-naphthothiazole ethiodide
2-(6-anilino-1,3,5-hexatrienyl)-α-naphthoselenazole ethiodide
2-(6-anilino-1,3,5-hexatrienyl)-β-naphthoselenazole ethiodide
2-(6-anilino-4-methyl-1,3,5-hexatrienyl)-thiazoline ethiodide
2-(6-anilino-4-methyl-1,3,5-hexatrienyl)-benzothiazole ethiodide
2(6-anilino-4-butyl-1,3,5-hexatrienyl)-benzothiazole ethiodide We have found that our new dyes are especially useful for extending the spectral sensitivity of the customarily employed silver chloride, silver chlorobromide, silver bromide, silver bromoiodide and silver chlorobromoiodide developing out emulsions. The dyes are equally effective in gelatinous emulsions and in those emulsions in which a synthetic colloidal carrier such as modified polyvinyl alcohol is employed.

To prepare emulsions sensitized with one or more of our new dyes, it is only necessary to distribute homogenously the dye or dyes in the photographic emulsions. The methods of incorporating dyes in emulsions are simple and are well known to those skilled in the art. In practice, it is convenient to add the dyes to the emulsions in the form of a solution in an appropriate solvent. Methanol has proved satisfactory for our new dyes; dimethylformamide or a mixture of acetone and freshly distilled pyridine may also be employed as a solvent. The dyes are advantageously incorporated in the finished, washed emulsions and should be uniformly distributed throughout the emulsions.

The concentrations of dyes in the emulsions can vary widely; e.g., from 5 to 100 milligrams per liter of flowable emulsion. The concentration of the dyes will vary somewhat according to the type of emulsion and according to the effect desired.

With most of our dyes, from 15 to 30 milligrams of dye per liter of emulsion (containing about 40 grams of silver halide) suffice to produce the maximum sensitizing effect. With the finer grain emulsions, somewhat larger concentrations of dye may be needed to produce the maximum sensitizing effect.

The new dyes of our invention have been found to be particularly useful since they operate to increase the sensitivity of photographic emulsions containing color formers fast to diffusion to a higher extent than comparable sensitizing dyes without the 6-cyanoethoxy-substituted benzothiazole nucleus. The sensitizing bands of the new dyes of our invention are unusaully sharp so that they render themselves advantageously for use in color emulsions.

The invention is further illustrated by the following examples although it is to be understood that the invention is not restricted thereto.

EXAMPLE I

*2-Methyl-6-(β-Cyanoethoxy)-Benzothiazole*

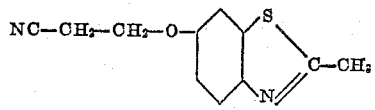

Eight grams (0.05 mole) of 2-methyl-6-hydroxybenzothiazole and 13.3 grams (0.25 mole) of freshly distilled acrylonitrile and 1 milliliter of benzyltrimethylammonium hydroxide (Triton B®) were heated to reflux on a steam bath for 20 hours. To the hot solution was then added 150 milliliters of benzene and 2 grams of (bone) charcoal. The black slurry was heated to reflux temperature for 10 minutes and then filtered through a Buchner funnel. The charcoal on the filter was extracted with hot benzene, and the combined filtrates placed into a separatory funnel. The basic catalyst was removed by washing. The benzene solution was washed with distilled water until the wash water was neutral to Alkacid® paper. The benzene layer was then washed twice with 60 milliliters of a 2.5 percent aqueous sodium hydroxide solution in order to remove any unreacted 6-hydroxy-2-methylbenzothiazole. The benzene solution was subsequently washed again with water until the wash water was neutral and then dried with anhydrous sodium sulfate overnight. Removal of the benzene and any acrylonitrile by distillation under aspirator vacuum yielded 7.60 grams of crude product. This material was crystallized from benzene. Yield: 6.6 grams; melting point 122–123°. A second recrystallization from benzene did not raise the melting point.

ANALYSIS FOR $C_{11}H_{10}ON_2S$

|  | C | H |
| --- | --- | --- |
| Calculated | 60.53 | 4.62 |
| Found | 60.59 | 4.62 |

EXAMPLE II

*2-Methyl-6-(β-Carbamylethoxy)-Benzothiazole*

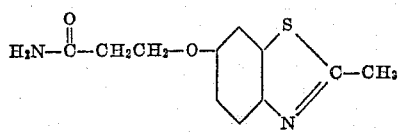

Ten milliliters of concentrated sulfuric acid and 2.18 grams (1/100 mole) of 2-methyl-(β-cyanoethoxy)-benzothiazole were heated together until the temperature reached 80° C. The clear solution was allowed to stand for five minutes during which time it cooled down to 70° C. The solution was then poured into 80 milliliters of ice water and stirred. It was filtered to remove any mechanical impurities and then neutralized by adding, dropwise, a 50 percent aqueous sodium hydroxide solution. After the neutral point (pH 7.0) was reached, 2 milliliters of the 50 percent alkali hydroxide solution were added in excess. The alkali-insoluble 2-methyl-6-(β-carbamylethoxy)-benzothiazole was filtered off and washed with distilled water until the filtrate was neutral. Traces of 2-methyl-6-(β-carboxyethoxy)-benzothiazole formed by complete hydrolysis of the nitrile remained in the alkaline solution. After drying, 2.31 grams of 2-methyl-6-(β-carbamylethoxy)-benzothiazole having a melting point of 179° to 181° C. was obtained.

ANALYSIS FOR $C_{11}H_{12}O_2N_2S$

|  | C | H | N |
| --- | --- | --- | --- |
| Calculated | 55.90 | 5.12 | 11.86 |
| Found | 55.86 | 5.08 | 11.70 |

EXAMPLE III

*2,5-Dimethyl-6-(β-Carbamylethoxy)-Benzothiazole*

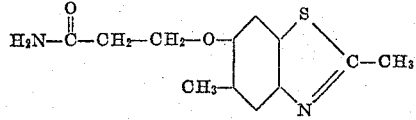

Example II is repeated except that the 2.18 grams of 6-(β-cyanoethoxy)-2-methylbenzothiazole are replaced by 2.32 grams of 6-(β-cyanoethoxy)-2,5-dimethylbenzothiazole.

EXAMPLE IV

*6-(β-Carbamylethoxy)-2-Methylbenzothiazole Ethioide*

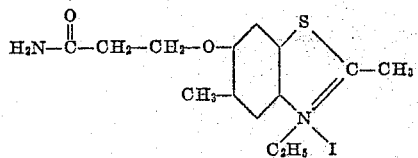

Two grams of 2-methyl-6-(β-carbamylethoxy)-benzothiazole and 6 mlililiters of ethyl iodide were heated in a sealed container at 110° C. for 3 hours. The quaternary salt obtained was filtered from the mother liquor and purified by trituration with acetone, benzene and ether. Yield: 1.4 grams; melting point, 169–171° C.

EXAMPLE V

*3-(β-Carboxyethyl)-6-(β-Carbamylethoxy)-2,5-Dimethylbenzothiazolium Iodide*

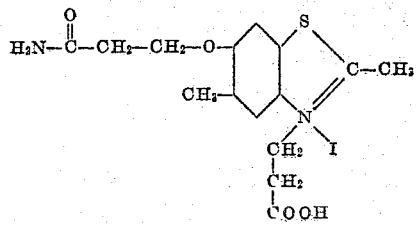

This product is obtained by heating 1.2 grams of 2,5-dimethyl-6-(β-carbamylethoxy)-benzothiazole and 10 grams of β-iodopropionic acid in a sealed bomb for 24 hours at 102° C. The resultant product is separated from the mother liquor by filtration and purified by trituration with ether, ethanol, acetone and again with ether.

EXAMPLE VI

*3-Ethyl-6-(β-Carbamylethoxy)-2-Methylbenzothiazolium p-Toluene Sulfonate*

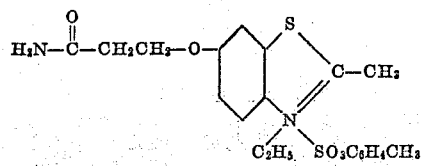

Two grams each of 6-(β-carbamylethoxy)-2-methylbenzothiazole and ethyl p-toluenesulfonate (20 percent excess) were melted together and heated in a metal bath of about 135 to 140° C. for 3 hours. After cooling to room temperature, the reaction mixture was dissolved in methanol, treated wtih charcoal and filtered. The methanol solution was then evaporated to dryness and 3.6 grams of solid product was obtained.

PREPARATION OF DYES—EXAMPLE VII

*1',3-Diethyl-6'-Methoxy-6-(β-Carbamylethoxy)Thiapseudocyanine Iodide*

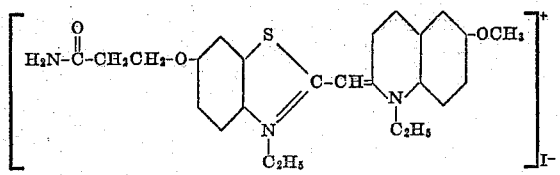

One hundred fifty-six milligrams (0.4 millimole) of 6 - (β-carbamylethoxy)-2-methylbenzothiazole ethiodide and 150 milligrams (0.4 millimole) of 2-ethylmercapto-6-methoxyquinoline ethiodide were dispersed in 7 milliliters of methanol. Ten drops of triethylamine were added, and the mixture heated on a steam bath to dryness. One milliliter of anhydrous pyridine and 15 milliliters of methanol were added in that order, and the mixture heated for 15 minutes on the steam bath. The slurry was centrifuged, and the mother liquor discarded. The dye was purified by successive extractions with methanol-benzene (1:14), isopropanol and ether. After drying, 150 milligrams of dye were obtained having a melting point of 179 to 181° C. The methanol solution had an absorption maximum at 501 millimicrons. This compound sensitized a photographic gelatine silver bromide-iodide emulsion to about 500 millimicrons with a maximum sensitivity at about 480 millimicrons.

EXAMPLE VIII

*1',3-Diethyl-6'-Methyl-6-(β-Cyanoethoxy) Thiapseudocyanine Iodide*

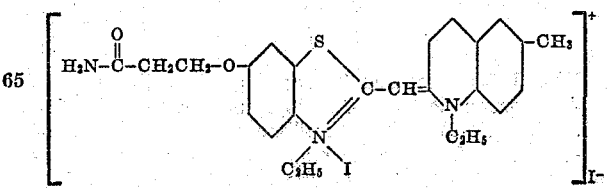

This dye was prepared from 156 milligrams of 6-(β-carbamylethoxy)-2-methylbenzothiazole ethiodide and 144 milligrams of 2-ethylmercapto-6-methylquinoline ethiodide following the procedure described in Example VII. The yield was 130 milligrams; the dye melted at 185 to 187° C. A methanol solution of the dye had an absorption maximum at 487 millimicrons. The dye sensitized a gelatine silver bromide-iodide emulsion to about 500 millimicrons with a sensitivity maximum at 480 millimicrons.

EXAMPLE IX
*4',5'-Benzo-6-(β-Carbamylethoxy)-3,9-Diethyl-3'-Methylthiacarbocyanine Iodide*

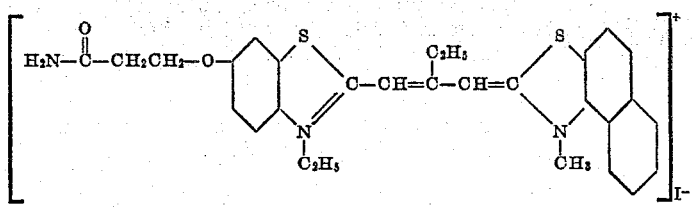

One hundred fifty-seven milligrams (0.4 millimole) of 6 - (β-carbamylethoxy)-2-methylbenzothiazole ethiodide and 171 milligrams (0.4 millimole) of 4,5-benzo-2-(β-ethyl - β-methylmercaptovinyl)-benzothiazole ethiodide were dispersed in 7 milliliters of methanol to which ten drops of triethylamine were then added. The mixture was heated to reflux for 15 minutes on a steam bath. The slurry was placed into a centrifuge glass and the solid separated from the mother liquor by centrifuging. The solid was purified by successive trituration with a mixture of methanol, benzene (1:14), isopropanol and ether. After drying, 140 mg. of dye was obtained which melted at 148–150° C. The methanol solution of this dye had an absorption maximum at 571 millimicrons. The compounds sensitized a photographic gelatine silver bromide iodide emulsion to about 665 millimicrons with the maximum sensitivity at about 645 millimicrons.

EXAMPLE X
*6'-(β-Carbamylethoxy)-3,3',9-Triethyl-5-Methoxy-selenathiacarbocyanine Iodide*

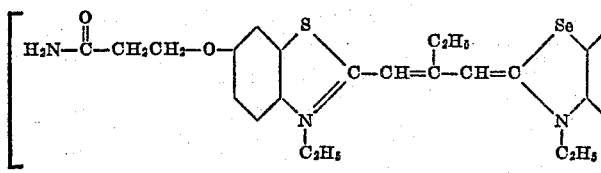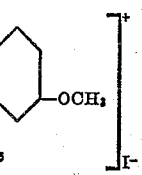

This dye is prepared by reacting 156 milligrams of 6 - (β-carbamylethoxy)-2-methylbenzothiazole ethiodide (0.04 millimole) with 187 milligrams (0.4 millimole) of 2 - (β - ethyl-β-methylmercaptovinyl)-5-methoxybenzoselenazole ethiodide under the conditions described in Example IX. After drying, 160 mg. of dye were obtained which melted at 145–147° C. The methanol solution had an absorption maximum at 570 millimicrons. The dye sensitized a photographic gelatine silver bromide iodide emulsion to about 635 millimicrons with a maximum sensitivity of about 620 millimicrons.

EXAMPLE XI
*3-Ethyl-3'-(β-Carboxyethyl)-5'-Methyl-6'-(β-Carbamylethoxy)-Thiacarbocyanine Iodide*

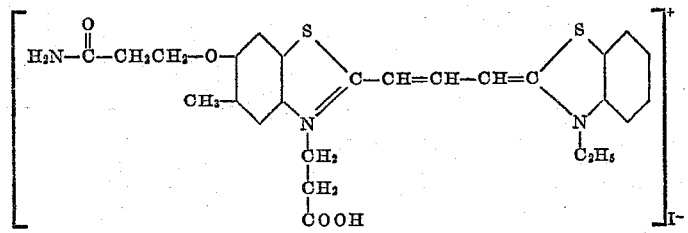

Twenty-five drops of triethylamine were added to a solution of 196 milligrams of 3-(β-carboxyethyl)-6-(β-carbamylethoxy)-2,5-dimethylbenzothiazolium iodide and 216 milligrams of 2-(β-acetanilidovinyl)-3-ethylbenzothiazolium iodide in 20 milliliters of ethanol. The product which separated on cooling was centrifuged and then washed with ethanol, acetone and ether.

EXAMPLE XII
*6'-(β-Carbamylethoxy)-3,3'-Diethyl-5,6-Dimethyl Oxathiacarbocyanine Iodide*

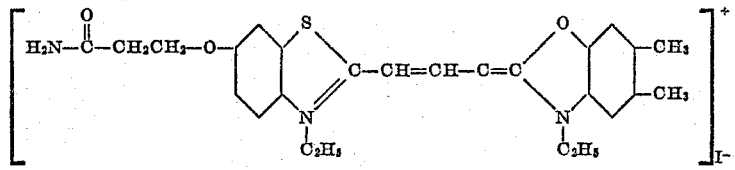

One hundred seventy-five milligrams of 3-ethyl-6-(β-carbamylethoxy)-2-methylbenzothiazolium p-toluenesulfonate and 185 milligrams of 2-(β-acetanilidovinyl)-3-ethyl-5,6-dimethyloxazolium iodide were dissolved in 20 milliliters of methanol. Twenty drops of triethylamine were added. The mixture was heated to boiling and then evaporated to dryness on a steam bath. The mixture was successively triturated with ether, isopropanol, acetone and again with ether. The dye melted at 280–282° C. The methanol solution showed an absorption maximum at 530 millimicrons. This dye sensitized a gelatine silver bromide iodide emulsion to about 590 millimicrons with a maximum sensitivity at about 580 millimicrons.

Various modifications of this invention will occur to persons skilled in the art. Thus, our intermediates can be used not only for the preparation of mono- and polymethine dyes of the types illustrated by the examples, but lend themselves also to the preparation of merocyanine and styryl dyes. We, therefore, do not intend to be limited in the patent granted except as necessitated by the appended claims.

This application is a continuation-in-part of our co-pending application, Serial No. 732,835, filed May 5, 1958, now United States Patent 2,984,667.

We claim:
1. Sensitizing dyes selected from the group consisting of those having the following formulae:

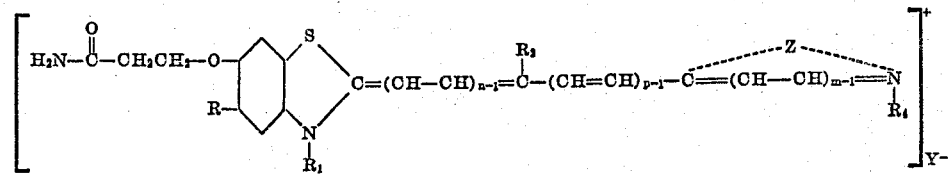

and

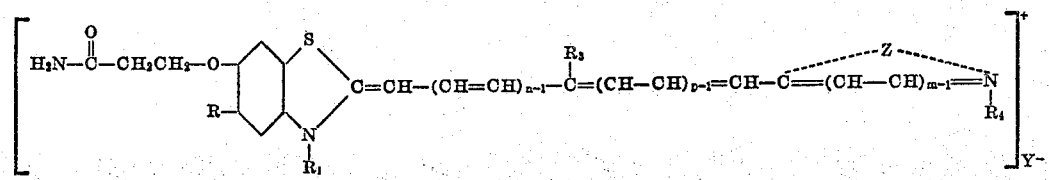

wherein R is a member selected from the class consisting of hydrogen and methyl; $R_1$ and $R_4$ are members selected from the group consisting of methyl, ethyl, propyl, butyl, amyl, hydroxymethyl, β-hydroxyethyl, α-hydroxypropyl, carboxymethyl, carboxyethyl, allyl, benzyl and phenethyl; $R_2$ and $R_3$ represent members selected from the group consisting of hydrogen, methyl, ethyl and propyl; $R_2$ being only hydrogen when $n$ and $p$ equal 1; $m$, $n$ and $p$ represent positive integers ranging from 1 to 2; Y represents an anionic radical of the type used in cyanine dyes, and Z represents the atoms necessary to complete a nitrogenous heterocyclic nucleus selected from the class consisting of a pyridine nucleus, a lepidine nucleus, a quinoline nucleus, an indoline nucleus, an oxazole nucleus, a thiazoline nucleus, a thiazole nucleus, a selenazole nucleus, a selenazoline nucleus, an oxazoline nucleus, a benzothiazole nucleus, a benzoselenazole nucleus, a benzoxazole nucleus, and a naphthothiazole nucleus.

2. T sensitizing dye having the following formula:

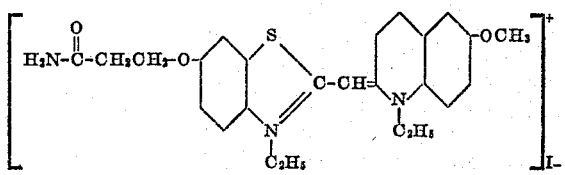

3. A sensitizing dye having the following formula:

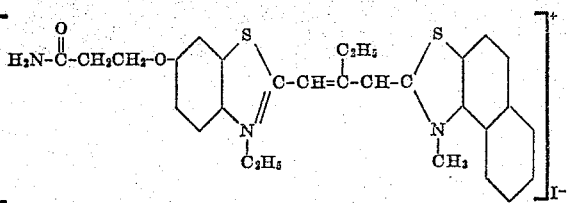

4. A sensitizing dye having the following formula:

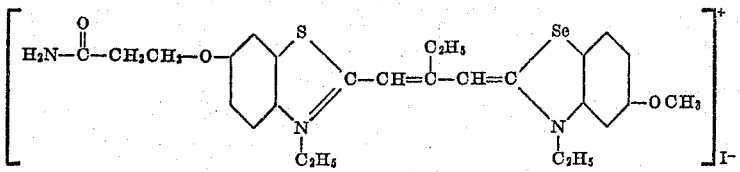

5. A sensitizing dye having the formula formula:

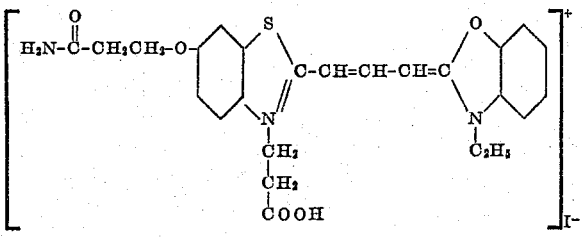

References Cited in the file of this patent
UNITED STATES PATENTS
2,984,667   Horwitz et al. _____ May 16, 1961

UNITED STATES PATENT OFFICE
CERTIFICATE OF CORRECTION

Patent No. 3,080,363                               March 5, 1963

Lester Horwitz et al.

It is hereby certified that error appears in the above numbered patent requiring correction and that the said Letters Patent should read as corrected below.

Column 1, line 33, for "-(β-carbamylethoxy-" read -- -(β-carbamylethoxy)- --; column 3, line 6, for "triethlamine" read -- triethylamine --; column 5, line 49, for "Ethioide", in italics, read -- Ethiodide --, in italics; line 58, for "mlililiters" read -- milliliters --; column 10, line 36, for "formula", first occurrence, read -- following --.

Signed and sealed this 7th day of January 1964.

(SEAL)
Attest:

ERNEST W. SWIDER                           EDWIN L. REYNOLDS
Attesting Officer                       Acting Commissioner of Patents